United States Patent [19] [11] Patent Number: 5,144,923
Leites et al. [45] Date of Patent: Sep. 8, 1992

[54] METHOD FOR THE MANUFACTURE OF A TWO PIECE PISTON AND PISTON

[75] Inventors: Jose M. M. Leites; Jose A. C. Mendes; Robert R. Banfield, all of Sao Paulo, Brazil

[73] Assignee: Metal Leve S/A Industria E Comercio, Sao Paulo, Brazil

[21] Appl. No.: 781,346

[22] Filed: Oct. 18, 1991

[30] Foreign Application Priority Data

Oct. 18, 1990 [BR] Brazil ............... PI 9005376

[51] Int. Cl.⁵ .................................... F02F 3/00
[52] U.S. Cl. .................................... 123/193.6; 92/186; 92/255; 29/888.04; 29/888.042; 29/888.044
[58] Field of Search .............. 123/193.6; 29/888.04, 29/888.042, 888.044, 888.045; 92/229, 255, 256, 176, 186, 227

[56] References Cited

U.S. PATENT DOCUMENTS 3,915,141 10/1975 Ottl et al. ............... 29/888.044
4,114,519 9/1978 Speaight .................. 92/256
4,550,707 11/1985 Kervagoret ............. 123/193.6
4,577,595 3/1986 Deutschmann et al. ...... 123/193.6
4,603,617 8/1986 Barth et al. .............. 92/255
4,843,698 7/1989 Ripberger et al. ........ 29/888.042
4,986,167 1/1991 Stratton et al. .......... 123/193.6

Primary Examiner—E. Rollins Cross
Assistant Examiner—M. Macy
Attorney, Agent, or Firm—Darby & Darby

[57] ABSTRACT

Piston tops (1, 70), specially those provided with combustion chamber (2, 20) and ring zone (3, 30) have their cooling condition sensibly improved in such regions due to a better use of the cooling oil capacity by closing the cooling chamber (5, 50) and the region 2I under the combustion chamber by annular ring members 96, 13) in a resilient material, e.g., a polymeric material or, preferably a spring steel, which clamp under the cooling chamber (5, 50) and the region 2I with dimensional interference respectively with grooves (10, 100), notches (11, 110) and groove 15. Methods for the manufacture of such top portion having a reduced compression height are also described.

16 Claims, 3 Drawing Sheets

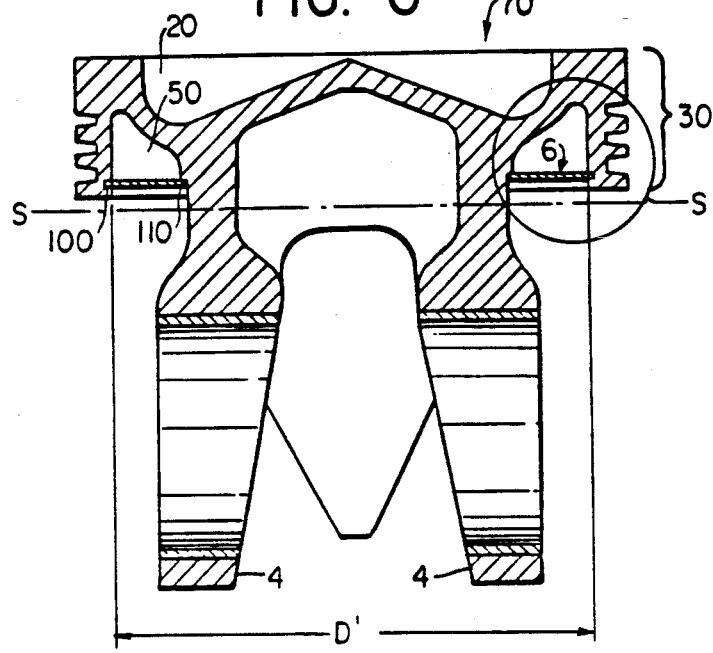
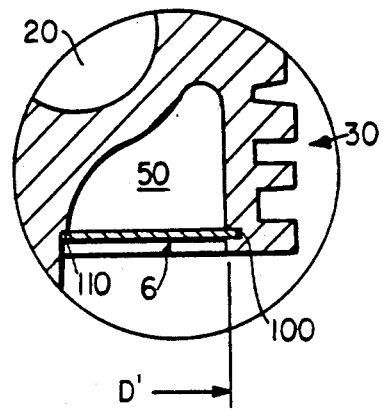
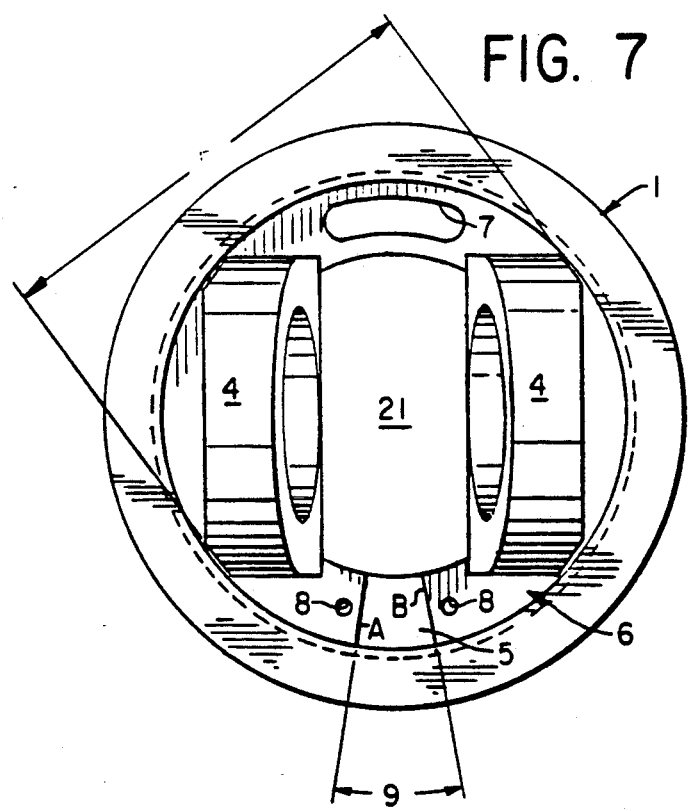

METHOD FOR THE MANUFACTURE OF A TWO PIECE PISTON AND PISTON

BACKGROUND OF THE INVENTION

The present invention relates to a method of manufacturing pistons, more particularly, pistons for high output internal combustion engines, which piston has a top portion, or top, with independent movements of the lower guide portion, or skirt.

This type of piston, known as an articulated piston because the top portion and the skirt are articulated by a common wrist pin, has appeared in view of the need for more resistant pistons and further due to the need for a better fit between the piston body and the cylinder liner. This brings about an increase of power and higher capacity of current generation engines.

Particularly relating to diesel engines, high temperatures predominate in the top portion, more intensively, in the combustion chamber and the ring zone.

A solution widely employed to attenuate the damages that such high temperatures may cause to these portions of the piston is the provision of a circumferential and peripheral concavity between the combustion chamber and the ring zone in the lower inner side of the top portion that, in turn, is juxtaposed to a peripheral recess in the higher portion of the skirt. This arrangement defines a reservoir, or cooling chamber, where oil injected from the crankcase circulates. When in the cooling chamber, the oil shakes against the inner walls of the chamber removing heat from the combustion chamber and the ring zone.

Such reservoir, or cooling chamber, has provided good results in effecting heat attenuation of the mentioned portions, however, when the thermal load is too high, the results are not as good.

If the independence of movements between the top and the skirt promotes the strong oil shaking the chamber, on the other hand, it is so strong that inertial forces cause a certain quantity of oil to exit the chamber, through the gap between the top and the skirt. This ejected oil is returned prematurely to the crankcase, without removing the required quantity of heat.

Such poor use of the oil cooling capacity impairs the combustion chambers of the reentrant type, which are deeper than the conventional chamber and designed to create a swirl, thereby improving combustion. The temperatures therein generated are still higher than in the common type of chamber.

Besides the technical deficiency attending this type of cooling chamber, its manufacturing cost is relatively high, especially because a peripheral recess in the upper portion of the skirt has to be provided with a trough, or tray, either by machining or by complex casting or forging dies.

Aiming to improve the heat removal process, there have been many proposals to keep the cooling oil for a longer period of time in the cooling chamber, thereby to increase the heat quantity removed from the combustion chamber.

BRIEF DESCRIPTION OF THE DRAWINGS

The invention will be described in greater detail with reference to the accompanying drawings representing two exemplary embodiments of the invention. In the drawings:

FIG. 6 is a longitudinal section view of another articulated piston top having a substantially reduced compression height as compared to the piston top portion of FIG. 1, which illustrates the second embodiment of the invention;

FIG. 6a shows a partial view of the piston top portion of FIG. 6, which is an enlargement of the sector indicated in FIG. 6; and FIG. 7 is a bottom view of the piston top portion of FIG. 6, in a plane normal to the piston axial plane.

DETAILED DESCRIPTION OF THE INVENTION

Figure 1:
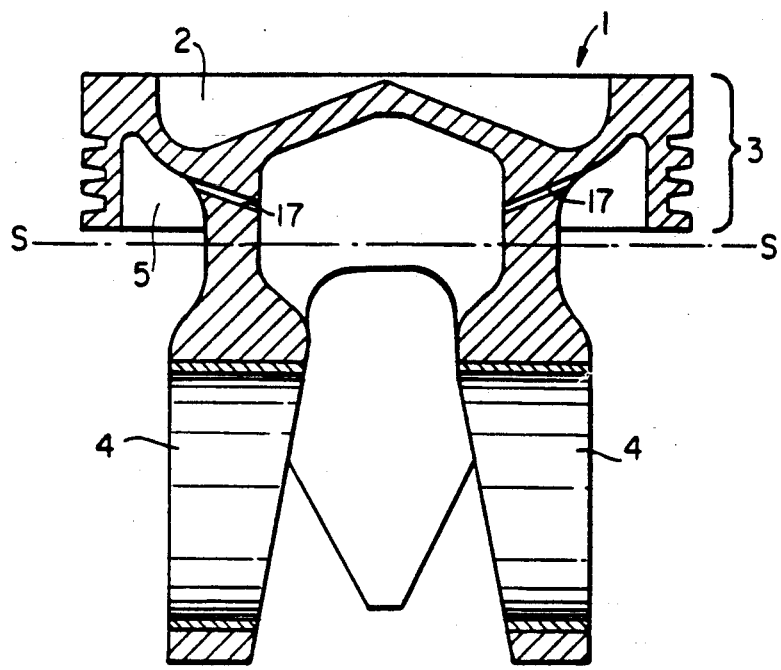
FIG. 1 is a longitudinal section view of an articulated piston top portion, representing a first embodiment of the invention.

According to a first embodiment as shown in FIG. 1, the piston top portion 1 is provided with a combustion chamber 2 of the reentrant type; a ring zone 3 comprising peripheral ring grooves and a pair of pin bosses 4 to accommodate a wrist pin (not shown) between the top 1 and the skirt portion (not shown).

To improve cooling conditions in the combustion chamber 2 and the ring zone 3, a cooling chamber 5 is provided between the chamber 2 and the ring zone 3.

Figure 2:
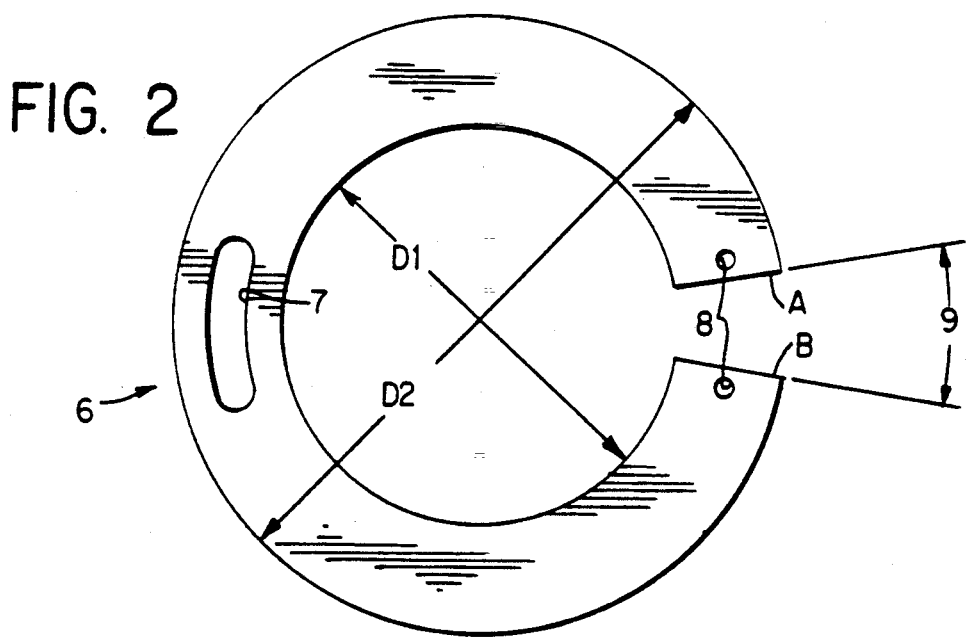
FIG. 2 shows an annular closing member for closing the cooling chamber of the articulated piston of the invention.

A longer dwelling time of the cooling oil in the chamber 5 improves the cooling conditions of combustion chamber 2 and ring zone 3. This is accomplished by fitting a semi-closed annular member 6, shown in FIG. 2, as will be described later. The piston top portion 1 of this embodiment is shown in FIG. 4.

Figure 4:
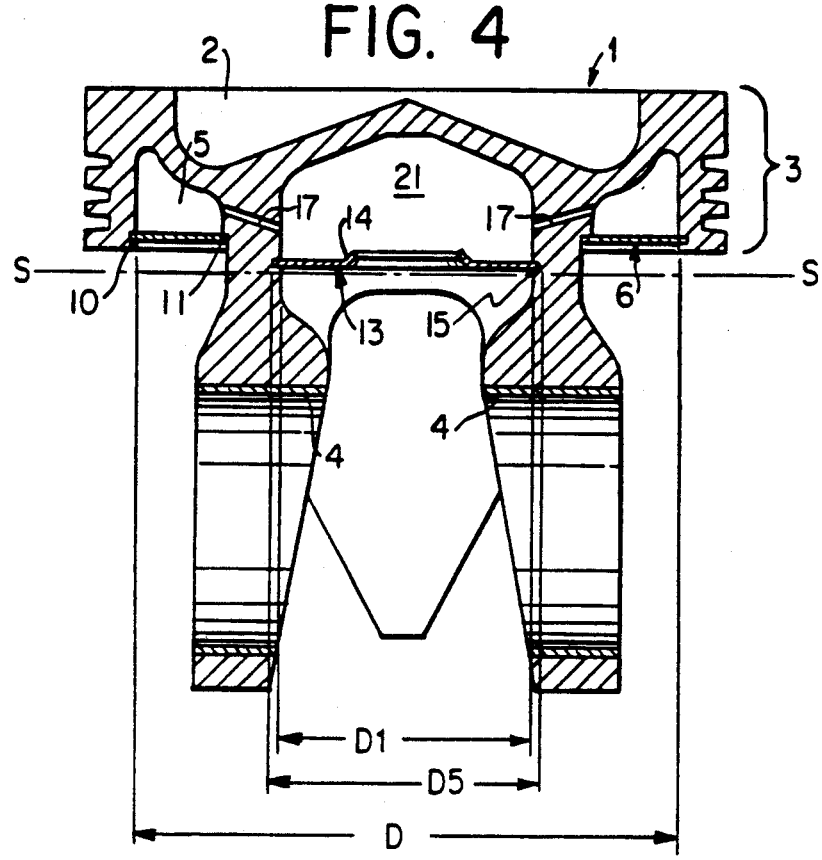
FIG. 4 is the piston top portion of FIG. 1, fitted with the annular member depicted in FIGS. 2 and 3, in accordance with the first embodiment of the present invention.

Still with respect to this first embodiment, now with reference to FIG. 4, the cooling chamber has a top 1, above the section SS which divides it at a high position of the piston pin bores 4. An upper portion cooling gallery, or chamber, 5 is therein provided as well as a peripheral groove 10 surrounding the chamber 5 on its lower plane, outside of the top 1. A notch is provided in the lower plane of the chamber 5, in the inner face of the top 1. In the lower limits of the bottom or undercrown 2I of the combustion chamber 2 a peripheral groove is provided having a peripheral position.

There is also provided a semi-closed annular ring member 6, in a shape corresponding to the outer contour of chamber 5 made of a resilient material, e.g., a polymer or, preferably a metal material such as spring steel or any other suitable material, whose (see FIG. 2) internal diameter is D1 and external diameter D2, the latter being greater than the dimension D of the chamber 5, measured between its outermost points on the top 1.

The ring member 6 has a diametral gap sector 9 whose edge surfaces are A and B and therewith two clamping holes 8. In another portion of said ring member 6, there is at least one through opening 7, shown as being elongated, for the cooling oil (not shown). To close the chamber 5, the member 6 is compressed in the diametral direction, i.e., by bringing the edge A near to the edge B, with the help of a tool (not shown) inserted in securing holes 8, to decrease the gap 9 to reduce diameter D2 and allow it to be inserted past the diameter D of chamber 5 until reaching the groove 10 and the step 11 (FIG. 4). There the ring member 6 is released and the closing compression force and firmly fitted in groove 10 and step 11, thereby closing the cooling chamber 5.

Figure 3:
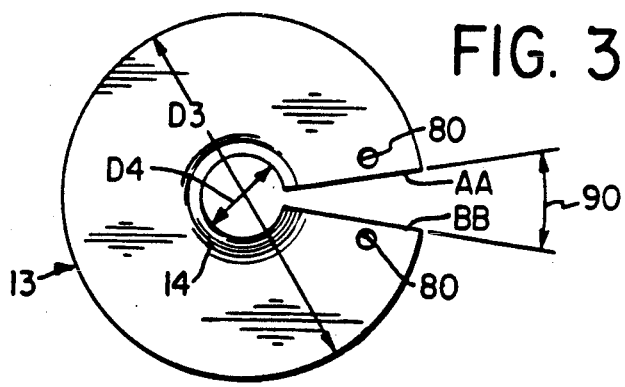
FIG. 3 depicts another annular member to be employed in the first embodiment of the invention.

To improve the cooling the undercrown 2I of the combustion chamber 2, there is provided a second semi-closed annular ring member 13, in a shape corresponding to the lower limits of the region 2I, shown in FIG. 3. The smallest lower internal dimension of member 13 is D4 while the largest external dimension is D3. Member 13 is further provided with an optional peripheral inner rim 14, slightly bent in relation to the surface of the dimension D3, and clamping holes 80 close to edges AA and BB. The material of the element 13 may be the same material of the member 6.

The fitting of the second ring member 13 on the top 1, specifically on the undercrown 2I, is accomplished by causing the edge AA to approach edge BB, usually with the help of a clamping tool (not shown) inserted in clamping holes 80, in an amount sufficient to reduce its outside diameter and allow it to access diameter D1 of undercrown 2I in the plane of a peripheral groove 15 previously provided in the crown, whose diameter D5 is slightly smaller than the diameter D3 of member 13, prior to the cited compression. In the compressed state, the member 13 is positioned inside the groove 15, and thereafter, the compressive tension is released, whereby member 13 becomes firmly positioned in groove 15 owing to its spring effect.

With the two ring members 6 and 13, respectively positioned in groove 10 and ledge 11 and in the groove 15, said top portion 1 above the section plan SS is joined to the pin boss portion 4, shown below the section plane SS, by welding, preferably by friction welding.

Figure 5:
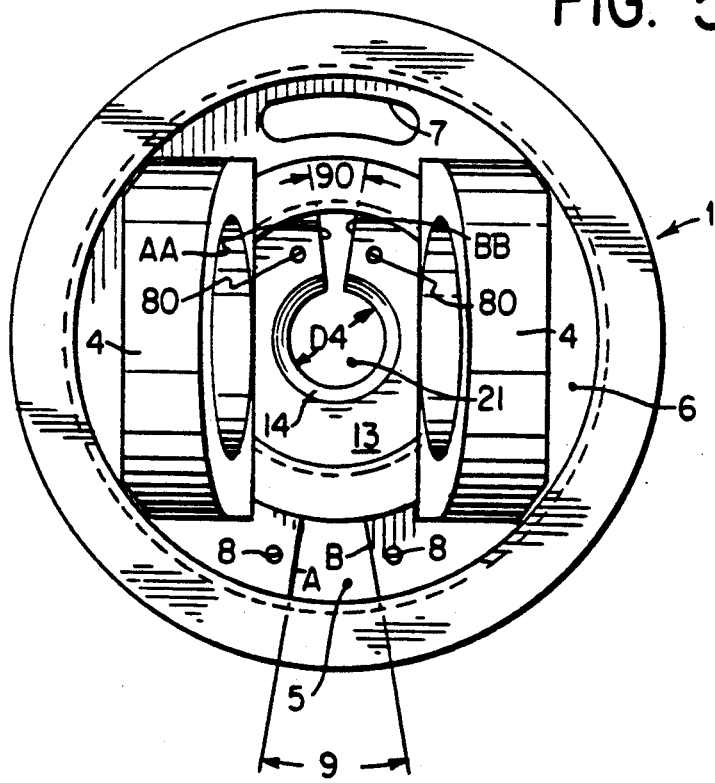
FIG. 5 is a bottom view of the piston top portion of FIG. 4 in a plane normal to the piston axial plane.

With further reference to this first embodiment of the invention, FIG. 5 depicts a bottom view of the top 1 having the ring members 6 and 13 duly fitted. With the engine running, oil from the crankcase is injected into the cooling chamber 5 through at least opening 7 and, a part of this oil goes to the undercrown 2I through passages 17, which are provided in the top to interconnect the chamber 5 and the undercrown 2I in order to balance the cooling rate of both undercrown 2I and chamber 5. The oil that reaches the undercrown 2I is contained by the second ring member 13 and with the movements of the piston top 1, the oil shakes inside the chamber 5 and the undercrown 2I. This brings about a more efficient cooling of the combustion chamber 2 and the ring zone 3 since the oil is kept confined for a longer period of time which can be preestablished as a function of the dimensions of opening 7 and the ring inner diameter D4.

The upward bending of rim 14 of the second ring member 13 is optional and contributes to the retention of the cooling oil for a longer period of time, in the undercrown 2I, the greater its inclination in the direction of the combustion chamber 2.

Upon the removal of heat by the cooling oil, it returns to the crankcase (not shown) through the gap 9 and opening 7, in member 6, and through the openings D4 and 90, in member 13.

Another embodiment of the invention concerns pistons having a reduced compression height (CM), enough to impair member 6 with welding flash when the top portion 1 is welded to the pin bosses 4. Now, with reference to FIG. 6, 6A and 7, there is shown a piston top 70 with a combustion chamber 20, a ring zone 30, a cooling chamber 50 and pin bosses 40 for a wrist pin (now shown).

In this embodiment, the piston top 70 is manufactured by any suitable method as a one-piece part, provided with an inner peripheral groove 100 in the outline of the chamber 50, close to the top 70 and a notch 110 slightly below the groove 100 in the outline of the chamber 50, in the innermost face of the top 70.

There is also provided a ring member 6, similar to that shown in previous embodiment, save for dimensions, whose outer dimension corresponds to the outline of the chamber 50. The member 6 is expanded so as to increase the gap 9, with the help of a clamping tool (not shown), in an amount to permit its internal diameter D1 to pass by the dimension E (see FIG. 7). Once passed the dimension E, the member 6 is moved in the direction of the cooling chamber 50, causing it to close, by inverting the direction of the closing tension applied to the clamping holes 80 in order to enable it to move past the dimension D' of the chamber 50, in the direction of groove 100. The closing tension is then released and member 6 is firmly fitted between groove 100 and the notch 110. FIG. 7 shows a bottom view of the piston top portion with ring member 6 fitted.

As in the prior embodiment, the combination of the resilient property (spring) of the material of the member 6 with the dimensional difference between its diameter D4 and the distance between the groove 100 and notch 110 ensure its fitting in the desired position. As in the first embodiment, the dimensions of the oil flow control holes (9, 7) should be defined as a function of the dwell time of the oil in the cooling chamber 50, according to specific engine design requirements.

It should be noted that the notch (11, 110) is positioned slightly below the groove (10, 100) so as to prevent any vibration of member 6 during the engine operation. The operation principles of this second embodiment are the same of the first one, concerning the cooling oil flow and its heat exchanging capacity.

What is claimed is:

1. Method for the manufacture of an articulated piston top 1, provided with a combustion chamber 2, ring zone 3, pin bores 4 to wrist pin (not shown) to articulate with a lower skirt portion (not shown) and a cooling chamber 5, characterized by the following essential steps:

a) manufacturing the top portion 1 above a sectional parting plane SS, which divides the uppermost top portion from the pin bores portion 4, providing a peripheral groove 10 surrounding the contour of the chamber 5, situated in the outermost face of the top 1, near the plane 55 and, in another plane nearer the plane SS, providing a notch 11 in the outline of the chamber 5, situated in the innermost face of the top 1;

b) providing a peripheral contouring groove 15 in the lower limit of the undercrown 2I;

c) taking a semi-closed member 6 in a resilient material having outermost dimension D1 and innermost D2, preferably in a round shape, corresponding to the contour of the chamber 5 nearer the section plane SS, provided with optional clamps 8 and radial edge A and B having a radial gap 9, besides at least one cooling oil hole passage 7;

d) compressing the member 6 in the diametric direction, nearing the edges A and B, decreasing the gap 9, enough so that the dimension D2 becomes less than the distance D between the outermost limits of the chamber 5, near the plane SS;

e) introducing the member 6 previously compressed in the top portion 1, driving it to the chamber 5 and positioning it in the direction of the groove 10 and notch 11;

f) releasing the compressing tension of the member 6;

g) taking semi-closed member 13 in a resilient material, optionally having an inner contour rim 14 for the oil retention, having a shape which corresponds to the contour of the region 2I near the plane SS, which innermost lower dimension is D4 and outermost higher dimension is D3 and further optional clamp holes 80 thereabout the edges AA and BB between which there is a radial gap 90;

h) compressing the member 13 by nearing the edges AA and BB, decreasing the gap 90, enough to access the region under 2I, in the dimension DI, and drive it to the plane of a groove 15 thereabout previously located in the diameter D5, lower than the diameter D3 of the member 13 before its diametral compression;

i) aligning the member 13 to the plane of the groove 15 and releasing its diametral compression;

j) joining the uppermost portion of the top 1, above the sectional plane SS with the pin bores portion 4, under the sectional plane SS.

2. Method according to claim 1, wherein the manufacturing of the top portion above the line SS is by casting or forging process followed by machining steps.

3. Method according to claim 1, wherein the provision of grooves (10, 15) and notch 11 is by machining the top portion 1 above the plane SS.

4. Method according to claim 1, wherein the provision of grooves (10, 15) and notch 11 above the line SS is accomplished during the forming process of the top portion 1 situated above the plane SS by means of corresponding forms in casting or forging dies.

5. Method according to claim 1, wherein the member (6, 13) is made of a resilient polymeric plate.

6. Method according to claim 1, wherein the member (6, 13) is made of a resilient spring-steel plate.

7. Method according to claim 1, wherein the compression of the member (6, 13) is made with a clamping tool (not shown), clamped on clamping holes (8, 80).

8. Method according to claim 1, wherein the location of the notch 11 is nearer the plane SS than the groove 10.

9. Method according to claim 1, wherein joining the uppermost top portion of the top 1 above the plane SS provided with ring members (6, 13) with the remaining bore portion 4 below the plane SS is made by welding, preferably friction welding.

10. Internal combustion engine piston top 1 provided with a combustion chamber 2, ring zone 3, wrist pin bores 4 to be articulately mounted on a skirt (not shown) and cooling chamber 5, characterized by having a closing under the cooling chamber 5 and the undercrown 2I, under the combustion chamber 2, with first and second semi-closed members (6, 13) retained in position by the association of the resilience of their material with a dimensional interference with the top 1.

11. Internal combustion engine piston top 1 according to claim 10, wherein the dimensional interference of the first member 6 is with a first groove 10 and a notch 11 and the dimensional interference of the second member 13 is with a second groove 15.

12. Method for the manufacture of an articulated piston top 70 provided with combustion chamber 20, ring zone 30 and bores 40, characterized by the essential steps:

a) taking a piston top 70 in one entire body provided with a peripheral groove 100 in the lower limit of the cooling chamber contour 50 in the outermost portion of the top 70, near the bores 40, having a notch 110 below the groove 100, in the innermost contour of the chamber 50;

b) taking a semi-closed member 6 in a resilient material, having an inner dimension D1 and outer D2, preferably round shaped and corresponding to the outline of the chamber 50, provided with optional clamps 8 and radial edges A and B between which there is a radial gap 9, besides at least one cooling oil hole passage;

c) applying a diametric opening tension in the member 6 separating the edge A from the edge B, increasing the gap 9, enough so that its lower dimension D1 will pass by the outermost dimension E of the bores 40 and drive it to the cooling chamber 50;

d) once beyond the bore portion 40 where the dimension is E, reversing the direction of the diametric tension on the member 6, changing it from a opening tension to a closing diametric tension, nearing the edges A and B, decreasing the gap 9, until it aligns to the groove 100 and the notch 110 and releasing the closing tension.

13. Method for the manufacture of a piston top 70 according to claim 12, wherein the piston top 70 is manufactured by casting or forging process followed by machining steps.

14. Method for the manufacture of a piston top 70 according to claim 12 wherein the provision of the groove 100 and the notch 110 is attained by machining the top 70.

15. Method for the manufacture of a piston top 70 according to claim 12 wherein the provision of the groove 100 and step 110 is attained during the forming process of the top 70 by corresponding forms in casting or forging dies.

16. Piston top 70 provided with combustion chamber 20, ring zone 30, pin bores 40 and cooling chamber 50, characterized by having a closing under the cooling chamber 50 with a semi-closed annular member 6 retained by the association of the resilience of its material with dimensional interference between it and a groove 100 and notch 110.

* * * * *